(No Model.) 3 Sheets—Sheet 1.

W. ROBINSON.
POWER BRAKE.

No. 572,662. Patented Dec. 8, 1896.

WITNESSES:
Jas. W. Ripley.
Chauncey P. Allen

INVENTOR:
Wm. Robinson.

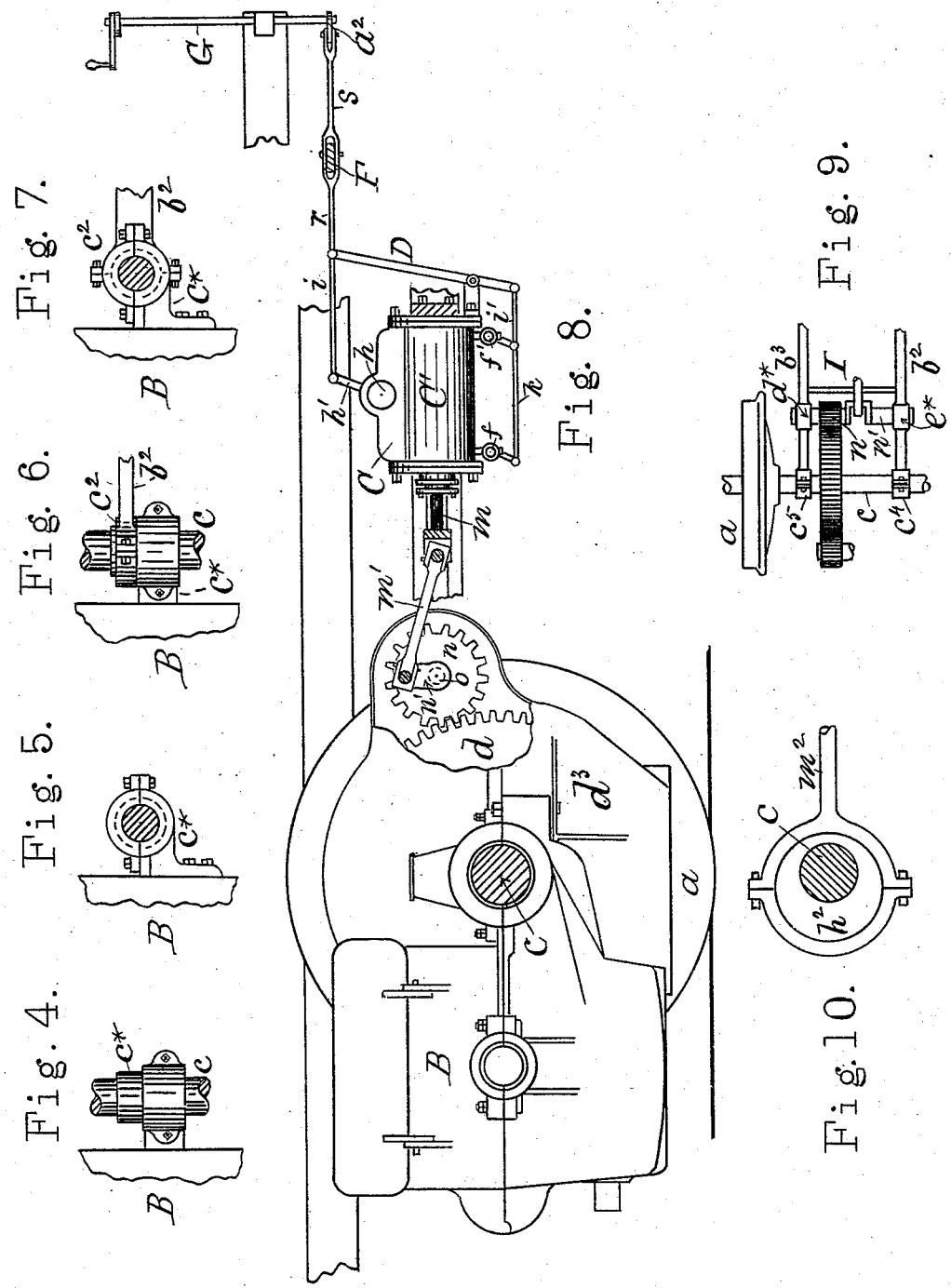

(No Model.) 3 Sheets—Sheet 3.

W. ROBINSON.
POWER BRAKE.

No. 572,662. Patented Dec. 8, 1896.

WITNESSES: Jas. W. Ripley. Chauncey B. Allen.

INVENTOR: Wm. Robinson.

UNITED STATES PATENT OFFICE.

WILLIAM ROBINSON, OF BOSTON, MASSACHUSETTS.

POWER-BRAKE.

SPECIFICATION forming part of Letters Patent No. 572,662, dated December 8, 1896.

Application filed January 21, 1895. Serial No. 535,617. (No model.)

*To all whom it may concern:*

Be it known that I, WILLIAM ROBINSON, a citizen of the United States, residing at Boston, in the county of Suffolk and State of Massachusetts, have invented a new and useful Power-Brake for Railway-Cars, of which the following is a specification.

The nature of my invention will be understood from the description which follows, reference being had to the accompanying drawings, which form a part of this specification, in which—

Figure 1:
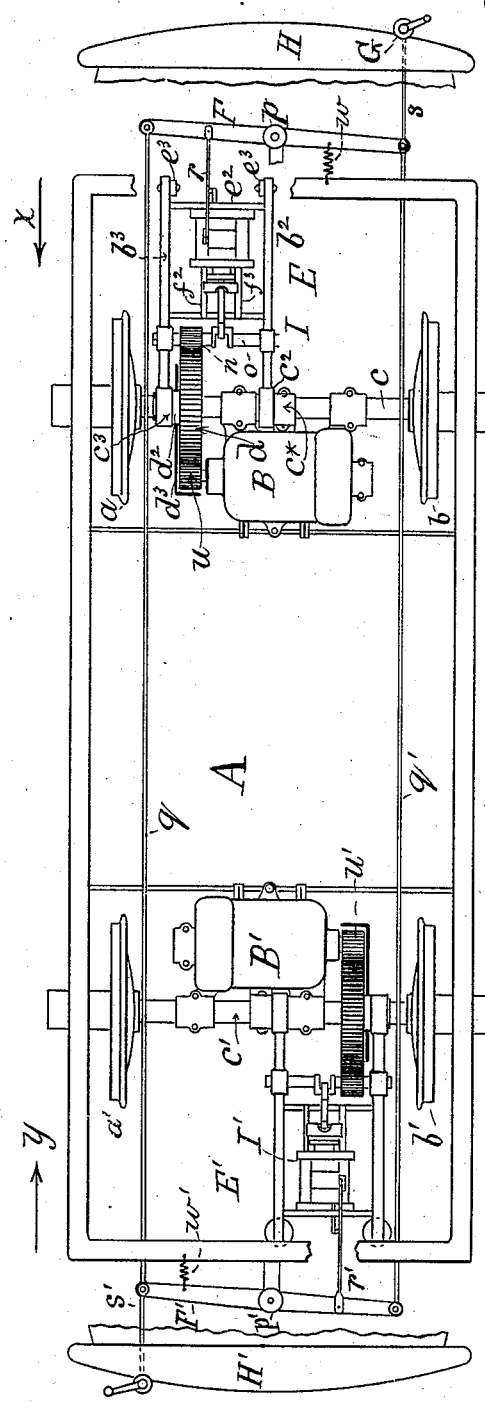
Figure 2:
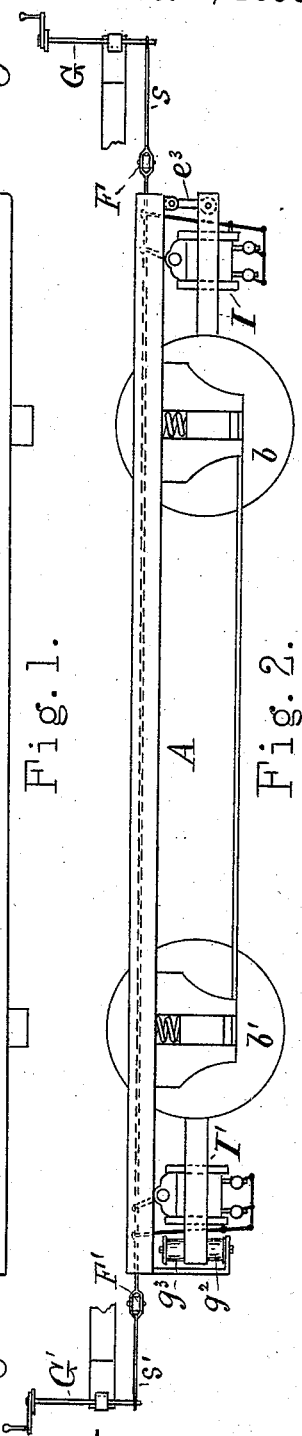
Figure 11:
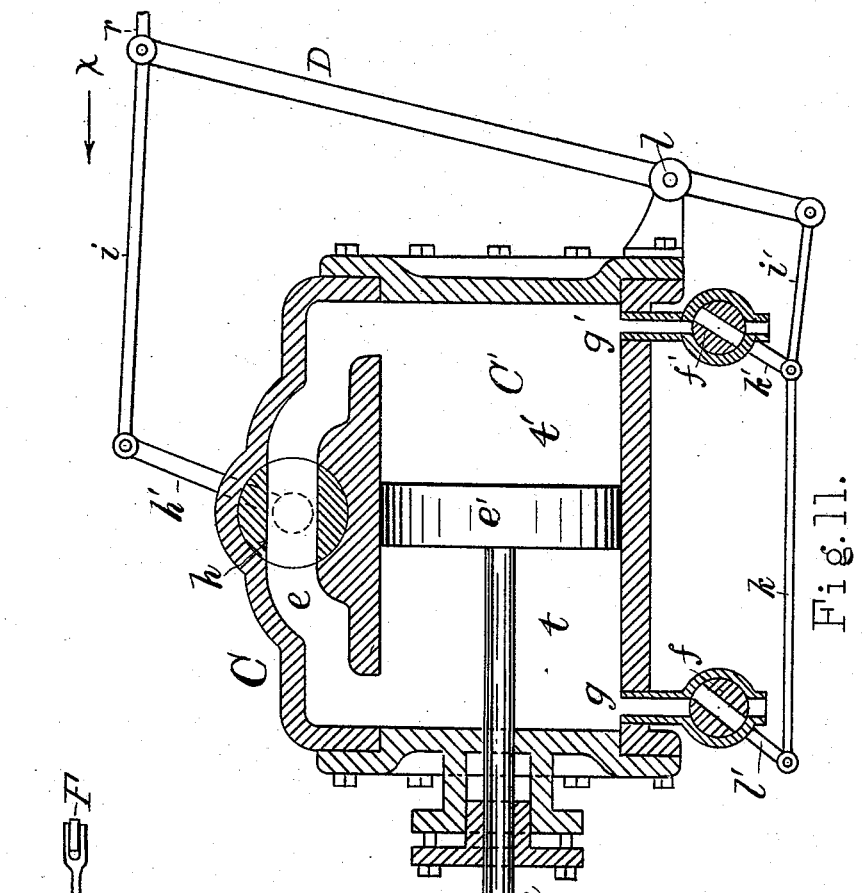
Figure 12:
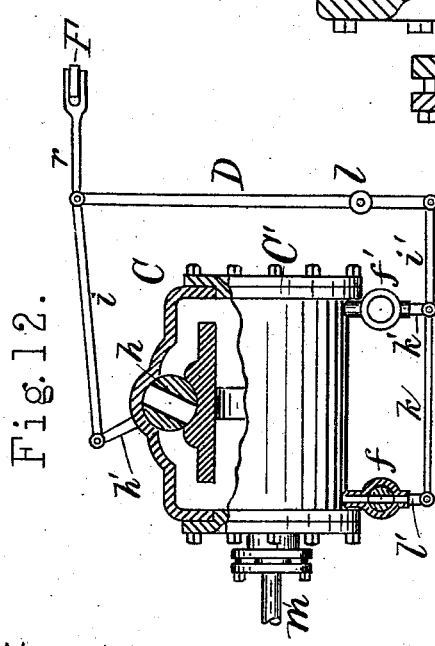
Figure 13:
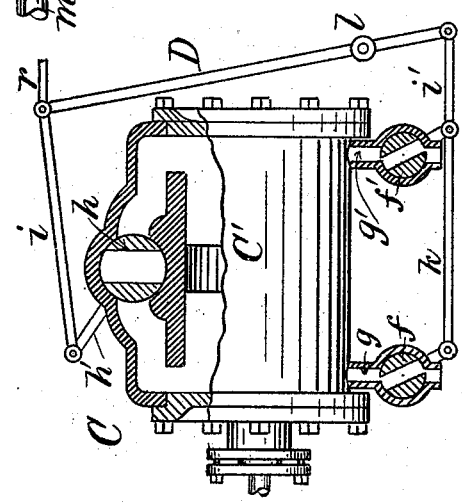

Figure 1 is a plan view of a car-truck, showing also portions of the car-body, illustrating the chief features of my invention. Fig. 2 is a side elevation of the same, illustrating the invention less fully, however. Figs. 3, 4, 5, 6, and 7 are details. Fig. 8 is an enlarged side view showing the application of the air or cushioning pump to the axle when a motor is used on the axle. Fig. 9 shows the application of the apparatus to the axle when a motor is not applied to the latter. Fig. 10 illustrates an alternate method of applying the apparatus to the axle. Fig. 11 is a section on an enlarged scale of the air-pump when inoperative as a cushioning-brake. Fig. 12 is a similar view, partly in section, showing the second position of the valves or stop-cocks, that is, their position just before entering upon the braking position; and Fig. 13 illustrates the position of the valves when the apparatus is operating as a full cushioning-brake.

A is a car-truck provided with the wheels $a\ b$, mounted on the axle $c$, and the wheels $a'\ b'$, mounted on the axle $c'$, all in the usual manner. The axle $c$ is provided with the motor B and the gear-wheel $d$, and the axle $c'$ with the motor B' and the gear-wheel $d'$.

C is an air or cushioning pump constructed with the passage $e$ leading to opposite sides $t\ t'$ of the piston $e'$ and so arranged that when said passage $e$ is open and the piston $e'$ is traveling back and forth the air in the cylinder C' passes freely through the passage $e$ from one side of said piston $e'$ to the other without retarding the free movement of said piston. The cylinder C' is provided also with the stop-cocks $f\ f'$, which control passage-ways $g\ g'$ between the outer air and the interior sections $t\ t'$ of said cylinder C' at opposite sides of the piston $e'$, as shown. The stop-cock $h$ is arranged to control the passage of air through the passage-way $e$ by opening or closing said passage, according to the position of said stop-cock. The lever D, fulcrumed at $l$, is connected to and controls the position of the stop-cock $h$ through the handle $h'$ and connecting-rod $i$. The stop-cocks $f$ and $f'$ are also connected to said lever D through the connecting-rods $i'$ and $k$ and the handles $k'\ l'$. Thus, it will be seen, the stop-cocks $h\ f\ f'$ are operated and controlled simultaneously by moving the lever D.

The motor B is geared through the pinion $u$ to the gear-wheel $d$ in the usual manner and through said gear-wheel drives the axle $c$. The pinion $n$ also engages the gear-wheel $d$, and the crank $n'$ is mounted on the pinion-shaft $o$ in any suitable manner. The piston-rod $m$ is connected to the crank $n'$ by the connecting-rod $m'$, all as clearly shown in Fig. 8.

It will be understood that the braking apparatus E', connected to the axle $c'$, is identical in construction with the apparatus E, just described, connected to the axle $c$.

The floating-levers F F' are pivoted, as shown at $p\ p$, either to the truck or car-body, as found most convenient, and these levers are connected together by the connecting or tie rods $q\ q'$. The apparatus E is connected, through its controlling-lever D and the connecting-rod $r$, to the floating-lever F, and in like manner the apparatus E' is connected, through its controlling-lever and the connecting-rod $r'$, to the floating-lever F'. The lever F is connected to the brake-staff G on the platform H by the rod or chain $s$, and the lever F' in like manner is connected to the brake-staff G' on the platform H' by the rod or chain $s'$.

The following is the method of operation: Assume that the car is moving rapidly, with the valves or stop-cocks of the pump C in the position shown in Fig. 11, and it is desired to check-up or stop the car. The driver turns the brake-staff G, thus actuating the floating-levers F F' and moving the connecting-rods $r\ r'$, respectively, in the directions of the arrows $x$ and $y$. The first movement of the rod $r$ in the direction of the arrow $x$ gradually turns the stop-cock $h$ to the position shown in Fig. 12, thus closing the passage $e$ between the opposite sides of the piston $e'$. The same movement opens the stop-cocks $f f'$. The stop-cocks $h$ and $f f'$, it will be observed, are so related to each other that the latter will be opened, thus connecting both sides $t\ t'$ of the cylinder $C'$ with the outer air before the stop-cock $h$ is closed. By this arrangement the air driven out of the cylinder $C'$ by the piston moving in one direction is replenished behind the piston from the outer air through the stop-cock on that side of the piston, whereas if all the stop-cocks were closed at the same time the air in front of the moving piston would be compressed, while that in its rear would be rarefied. As a result, when the piston returned the compressed air behind it and partial vacuum in front of it would accelerate its movement, thus reversing the continuous retardation required in braking. By continuing the turning of the brake-staff, however, the apparatus is gradually brought approximately to the position shown in Fig. 13. In this figure, it will be noted, the stop-cock $h$ is still closed and the stop-cocks $f f'$ nearly closed. Under these conditions the moving piston compresses the air in front of it and drives it out under pressure through the slightly open stop-cock $f$, for instance. At the same time air passes into the cylinder through the partly open stop-cock $f'$, filling up the space $t'$ behind the piston $e'$ with air under atmospheric pressure. When the piston begins its return stroke, it encounters the cylinder full of air under atmospheric pressure. In compressing this air and forcing it through the small orifice of the approximately-closed stop-cock $f'$ the piston $e'$ meets with great resistance to its free movement. Thus, it is evident, the piston $e$ is retarded at every stroke in each direction, the degree of retardation depending upon the extent to which the stop-cocks $f f'$ are opened.

It will be understood that as the piston $e'$ is retarded and slowed down the motion of the pinion $n$ is also of course retarded and slowed down in like proportion, and as the pinion $n$ meshes with the gear-wheel $d$ on the axle $c$ said gear wheel and axle with its wheels are slowed down and quickly stopped, since their movements depend on the free or retarded movements of said piston $e'$.

The same movement of the brake-staff which controls and operates the apparatus E also controls and operates the apparatus E', and if there be more than four wheels on a truck they may be all provided with braking apparatus, as described, and all be operated simultaneously from either end of the car.

It is evident from the foregoing description that the apparatus described forms a prompt, reliable, and efficient power-brake system. It is especially efficacious on heavy downgrades, since however rapidly the car may be moving, even if control of it has been lost, it is quickly brought under control again, and the wheels, when desired, are brought almost to the point of stopping, without locking them, however.

In connection with this braking system it is intended to have the car equipped with the ordinary hand-brake. Nevertheless there will be little use for this except to lock the wheels when the driver is about to leave the car.

It is evident, then, that in using my brake system described there will be great saving in wheels and brake-shoes, as well as in the time of bringing cars to a halt, to say nothing of the saving in the driver's muscle.

Figure 3:
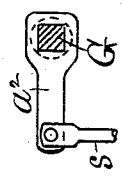

As illustrated in Figs. 3 and 8, the brake-staff G is provided with the crank $a^2$, to which the connecting-rod $s$ is pivotally connected. By this arrangement the driver is enabled to throw the apparatus into braking position by turning the brake-staff G in one direction and out of braking position by turning said brake-staff in the opposite direction. Nevertheless, if desired, the springs $w\ w'$ may be arranged to throw the apparatus out of braking position.

The side bars $b^2 b^3$ of the frame I which supports the air-pump C have their inner ends supported concentrically with the axle $c$, or as nearly so as practicable. The inner end of the bar $b^2$ is supported by the motor B, or, rather, by a projection $c^*$ from the same, as shown at $c^2$. (See Figs. 1 and 4 to 7.) In like manner the inner end of the bar $b^3$ is mounted flexibly on the hub $d^2$ of the gear-cover $d^3$, as shown at $c^3$.

The outer ends of the bars $b^2 b^3$ are rigidly connected together by the bar $e^2$, and the frame I is provided with the slide-rests $f^2 f^3$, on which the piston-rod $m$ slides back and forth. The crank-and-pinion shaft $o$ is mounted between and supported by the bars $b^2 b^3$, as shown.

The outer end of the frame I is flexibly connected to the truck-frame A by the links $e^3$, while the outer end of the corresponding frame I' is shown as flexibly connected to the said truck-frame through the intervention of springs $g^2 g^3$, the springs $g^2$ directly supporting the outer end of the frame I', while the springs $g^3$ are placed above said frame or a connection of the same. Thus whether the outer end of said frame tends to rise or fall it meets with a cushioning-spring resistance.

Either of the above-described methods of connecting the pump-supporting frame to the car-truck may be used, but I prefer the use of springs, in order to prevent as far as possible the motion and jar of the truck being imparted to said pump-supporting frame.

It is evident that since the inner end of the frame I is supported concentrically, or nearly so, with the axle the vertical movement of the outer end of said frame, caused by the vertical movement of the truck-frame on the springs, will not disturb the proper meshing of the pinion $n$ and gear $d$. Furthermore, since, as shown in Fig. 1, the inner end of the frame I is supported flexibly on the motor and on the gear-cover and none of the parts in contact with said frame revolve, the friction at the points of connection is so slight as to need no lubrication or further consideration. When, however, this braking apparatus is to be applied to an axle which has no motor, it may be connected to the axle as shown in Fig. 9, in which the frame I is sleeved to the axle $c$, as shown at $c^4$ $c^5$, said axle revolving within said sleeves.

In Fig. 10 the axle $c$ is provided with the eccentric $h^2$, which operates to throw the connecting-rod $m^2$, used instead of $m'$, back and forth as the axle revolves, said connecting-rod $m^2$ operating the air-pump in the manner already described. In this case the eccentric $h^2$ is to take the place of the pinion $n$ and gear $d$. I prefer the gear mechanism, however, since the action of pumping is much more rapid and the leverage for stopping the revolution of the wheels and axle much greater.

Having thus described my invention, what I claim as new, and desire to secure by Letters Patent, is—

1. In a power-brake, the combination of a cylinder with its piston, a stop-cock controlling the free passage of air from one side of said piston to the other, stop-cocks located at opposite ends of said cylinder and connecting the interior of the same with the outer air and mechanism connecting said various stop-cocks in one system whereby they may all be operated by a single movement, substantially as described.

2. In a power-brake mechanism, the combination substantially as described, of a cylinder with its piston and piston-rod, a stop-cock controlling the passage of air from one side of said piston to the other, stop-cocks located near the opposite ends of said cylinder and opening outwardly from the interior of the same, mechanism connecting said various stop-cocks in one system whereby they may be operated simultaneously, and means for connecting the piston-rod of said cylinder to the car-axle, said means being adapted to produce reciprocating motion in said piston-rod.

3. In a power-brake, the combination, substantially as described, of a cylinder with its piston and piston-rod, a stop-cock controlling the passage of air from one side of said piston to the other, stop-cocks located near the opposite ends of said cylinder and opening outwardly from the interior of the same, mechanism connecting said various stop-cocks in one system whereby they may be operated simultaneously, a gear-wheel secured to the car-axle, a pinion engaging said gear-wheel, the pinion or pinion-shaft being provided with a crank, and a connecting-rod connecting said piston-rod and crank together, the movement of said piston-rod controlling the movement of said pinion and gear-wheel.

4. In a power-brake, the combination, substantially as described, of the cylinder with its piston and piston-rod, said cylinder being provided with an open passage connecting the opposite ends thereof, a stop-cock adapted to open or close said passage, stop-cocks located at opposite sides of said piston and opening outwardly from said cylinder, and mechanism arranged to first close said first-named stop-cock and next to gradually approximately close said second-named stop-cocks, thus producing an air-cushioning resistance to the movement of said piston at each side thereof and tending to bring the same to a full stop.

5. In combination, a brake apparatus arranged to retard or stop the revolution of the car-axle and its wheels, through the direct action of an air pump, or compressor, connected to said axle, said pump being provided with stop-cocks or valves, two floating-levers connected together and arranged to move in unison and parallel to each other, one of said levers being connected to and controlling the operation of the stop-cocks or valves of, said braking apparatus, said levers, respectively, being connected to the brake-staffs or controlling devices on the respective platforms of the car, whereby said braking apparatus may be operated and controlled from either end of the car, substantially as described.

6. In combination, substantially as described, two power-brake devices arranged respectively to control or stop the two axles with their wheels of a car or truck, through the direct action of air pumps, or compressors, connected to said axles, said pump being provided with stop-cocks or valves, two floating-levers connected together and arranged to move in unison, said levers respectively, being connected to and controlling the operation of the stop-cocks or valves of, the respective brake devices, said levers, respectively, being also connected to the brake-staffs or controlling devices on the respective platforms of the car, whereby both of said braking devices may be operated and controlled from either end of the car.

7. In combination, the floating-levers F F' connected to and controlling the operation of the brake mechanism, said floating-levers being connected together and moving in unison, and being connected, respectively, by the rods or devices $s$, $s'$, to crank-levers secured to the brake-staffs, whereby the brake apparatus is applied by turning the brake staff or controller in one direction and released by turning the same in the opposite direction, the operation of said crank-levers upon said brake mechanism being direct and positive in whichever direction said crank-levers may be turned, substantially as described.

WILLIAM ROBINSON.

Witnesses:
S. G. CROSWELL,
JAS. W. RIPLEY.